United States Patent [19]

Weehunt

[11] Patent Number: 5,718,435
[45] Date of Patent: Feb. 17, 1998

[54] SEAL CAGE

[76] Inventor: Dennis L. Weehunt, 3843 Ross Inlet, Coos Bay, Oreg. 97420

[21] Appl. No.: 605,512

[22] Filed: Feb. 26, 1996

[51] Int. Cl.⁶ ..................................................... F16J 15/18
[52] U.S. Cl. .................. 277/1; 277/9; 277/68; 277/69; 277/72 FM
[58] Field of Search ................................. 277/9, 19, 59, 277/68, 69, 72 FM, 1; 182/196, 197, 198; 198/848, 850, 851, 853

[56] References Cited

U.S. PATENT DOCUMENTS

| | | |
|---|---|---|
| 249,415 | 3/1881 | Nicholls et al. . |
| 1,557,379 | 10/1925 | Sudekum . |
| 1,603,206 | 10/1926 | Hull . |
| 1,914,741 | 6/1933 | Gysling ........................... 277/68 |
| 2,049,774 | 8/1936 | Hoffman . |
| 2,071,204 | 2/1937 | Hunt . |
| 2,111,200 | 3/1938 | Amourelle . |
| 2,215,034 | 9/1940 | Gorman . |
| 2,244,054 | 6/1941 | Cornell, Jr. ..................... 277/68 |
| 2,267,183 | 12/1941 | Williams ........................ 277/68 |
| 2,336,474 | 12/1943 | Fulcher . |
| 2,390,602 | 12/1945 | Maier ............................ 277/68 |
| 2,422,502 | 6/1947 | Schrader ........................ 277/68 |
| 2,486,359 | 10/1949 | Mayfield . |
| 2,906,395 | 9/1959 | Greer ............................ 198/850 |
| 3,015,381 | 1/1962 | Mohwinkel et al. ........... 198/850 |
| 3,082,825 | 3/1963 | Hanner, Jr. ..................... 277/68 |
| 3,160,024 | 12/1964 | Mojonnier ..................... 198/850 |
| 3,284,087 | 11/1966 | Luck . |
| 3,357,693 | 12/1967 | Perry . |
| 3,398,964 | 8/1968 | Trefil ........................... 277/72 FM |
| 3,528,666 | 9/1970 | Prampart . |
| 3,528,667 | 9/1970 | Spaven . |
| 3,680,927 | 8/1972 | Neureuther .................... 198/850 |
| 3,825,270 | 7/1974 | Paramonoff et al. . |
| 3,834,715 | 9/1974 | Butler . |
| 4,498,681 | 2/1985 | Heinz . |
| 4,531,404 | 7/1985 | Phelps et al. . |
| 4,543,832 | 10/1985 | Van Over . |
| 5,013,053 | 5/1991 | Champlin . |
| 5,168,981 | 12/1992 | Ruff .............................. 198/850 |

FOREIGN PATENT DOCUMENTS 34133  7/1927  France .

OTHER PUBLICATIONS

Glowacki, J.J., "Mills Use New Sealing Compound to Minimize Water Consumption," *Pulp and Paper*, pp. 97–98 (Nov. 1995).

*Primary Examiner*—Scott Cummings
*Attorney, Agent, or Firm*—Klarquist Sparkman Campbell Leigh & Whinston, LLP

[57] ABSTRACT

The present invention provides an improved seal cage for maintaining selected spacing between packing seal rings of an injectable sealing compound system. It comprises a pair of flexible elongate rails that are laterally spaced apart by rigid braces which extend between the rails and are held in brace receptacles spaced apart longitudinally of a rail. The rails can be cut to encircle shafts of different circumferences and the braces can be of any desired length. For convenience sake, a seal cage according to the present invention can be provided as kit comprising, for example, rails having brace receptacles of different heights, braces of different lengths, and master links for connecting sections of seal cage to produce longer seal cages.

29 Claims, 3 Drawing Sheets

U.S. Patent  Feb. 17, 1998  Sheet 1 of 3  5,718,435

SEAL CAGE

FIELD OF THE INVENTION

The present invention relates generally to apparatus and a method for maintaining selected spacing between packing seal rings used with rotary or reciprocating shafts, and more specifically to a seal cage placed between packing seal rings in an injectable sealing compound system.

BACKGROUND OF THE INVENTION

Injected sealing compound systems have been introduced as an alternative to expensive mechanical seals used with rotating shafts or braided compression packing used with rotating or reciprocating shafts, e.g., in pumps, compressors, or other apparatus. Unlike mechanical seals and braided compression packing, injectable sealing compounds are self-lubricating, eliminate leakage, need no cooling water or flush water, and do not damage shaft sleeves. Injectable sealing compound systems therefore can substantially reduce or eliminate flush water consumption and equipment maintenance, resulting in substantial savings. See, e.g., Glowacki, "Mills Use New Sealing Compound to Minimize Water Consumption," *Pulp and Paper*, November 1995, 97–98.

In an injectable sealing compound system, a stuffing box provided with a fluid injection port surrounds a rotating or reciprocating shaft that extends through the stuffing box bore. Packing seal rings concentrically surround the shaft at opposite ends of the stuffing box bore. The space between the packing seal rings is filled with an injectable sealing compound that is injected under greater than atmospheric pressure into the stuffing box through an injection port.

Leakage of the injectable sealing compound from the stuffing box can cause the packing seal rings to move toward each other. If one of the packing seal rings blocks or moves past the injection port, it is necessary to shut down the machinery and reposition the rings before resealing. If a packing seal ring opens up at its joint, sealing compound can escape from the stuffing box.

There has been a need for apparatus for maintaining spacing between packing seal rings in an injectable sealing compound system and to improve the sealing of the injectable sealing compound between the packing seal rings.

SUMMARY OF THE INVENTION

It is an object of the invention to provide an apparatus and a method for maintaining selected spacing between packing seal rings.

It is a further object of the invention to provide a seal cage that effectively maintains selected spacing between packing seal rings of an injectable sealing compound system, particularly when injectable sealing compound leaks from the stuffing box.

It is a further object to improve sealing of the stuffing box of an injectable sealing compound system by the injectable sealing compound.

It is a further object of the invention to provide a seal cage that may be configured to fit around shafts of different diameters.

It is a further object of the invention to provide a seal cage that can be configured to maintain different preferred spacings between packing seal rings or restrictor rings in a stuffing box.

To these ends the present invention as configured in one embodiment provides a seal cage in a ladder-like configuration comprising a pair of flexible elongated rails that are laterally spaced apart by rigid braces, e.g., pins, extending between the rails. The pins are held in brace receptacles spaced apart longitudinally of a rail. The height of the brace receptacles is no greater than a preferred packing seal ring size.

The seal cage is designed to provide openings of a size sufficient to permit injectable sealing compounds, which can be putty-like in consistency, to completely fill the seal cage and to seal to the shaft and to the walls of the stuffing box.

The rails can be cut to a length corresponding to a given shaft size. Moreover, the braces can be of any desired length to allow the seal cage to be adapted for use with a wide range of stuffing box depths.

For convenience sake, a seal cage according to the present invention can be provided as a kit comprising, for example, rails having brace receptacles of different heights, braces of different lengths, and master links for connecting sections of rail to produce longer rails for larger diameter seal cages.

Use of an injectable sealing compound system including a seal cage according to the invention results in lower total material and operation costs and substantially lower water consumption (since flush water can be eliminated) as compared with standard compression packing or mechanical seals.

The foregoing and other features and advantages of the invention will become more apparent from the following detailed description and accompanying drawings.

DETAILED DESCRIPTION OF A PREFERRED EMBODIMENT

Figure 1:
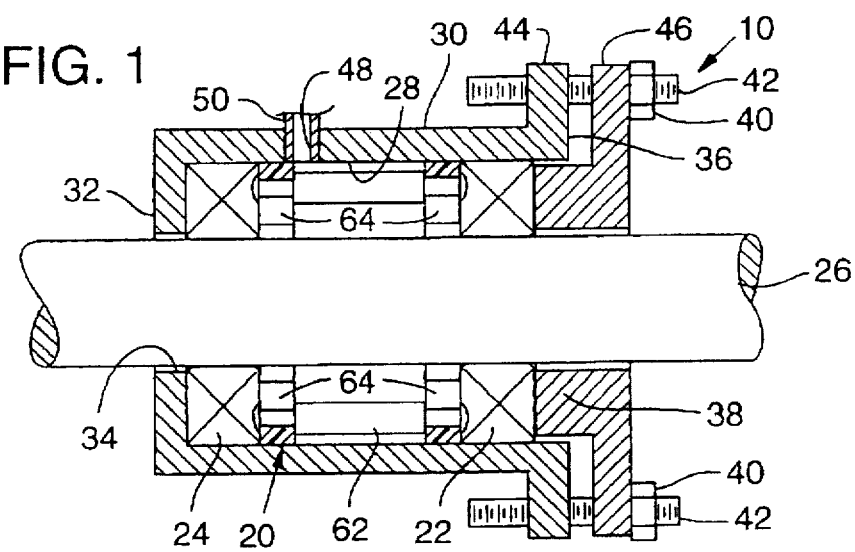
FIG. 1 is a simplified cross-sectional view of an injectable sealing compound system including apparatus according to one embodiment of the invention.

While the present invention is susceptible of embodiment in many different forms and would be useful in a wide variety of apparatus, there is shown in the drawings and will herein be described in detail preferred embodiments of the invention. The present disclosure is, however, to be considered an exemplification of the principles of the invention and is not intended to limit the broad aspect of the invention to the embodiment illustrated. Those skilled in the art will appreciate the utility of this invention, which is not limited to the specific embodiments and materials described herein.

Seal cages according to the invention can be used with a variety of conventional sealing systems associated with rotatable or reciprocatable shafts. FIG. 1 shows one embodiment of an injectable sealing compound system 10 surrounding a rotatable or reciprocating shaft 26. The system 10 includes a seal cage 20 according to the invention positioned between spaced apart top and bottom packing seal rings 22, 24 that concentrically surround the shaft 26 at the opposite ends of the bore 28 of a stuffing box 30. End 32 of the stuffing box has a centrally located shaft opening 34 of a diameter sufficient to permit the shaft 26 to penetrate the stuffing box 30. The opposite end 36 of the stuffing box is closed by a flanged packing follower, or gland, 38 that extends into the stuffing box bore 28 to contact and exert pressure against the contents thereof. The position of the packing follower 38, and thus the pressure it exerts on the contents of the stuffing box, can be adjusted by means of the packing follower nuts 40 that are threaded onto threaded studs 42 that pass through flange 44 on the stuffing box and flange 46 on the packing follower.

Injectable sealing compound is injected under greater than atmospheric pressure into the bore 28 of the stuffing box through a fluid inlet port 48, that extends through the stuffing box 30, via a fluid inlet nipple 50. The seal cage 20 is located under the fluid inlet port 48.

Figure 2:
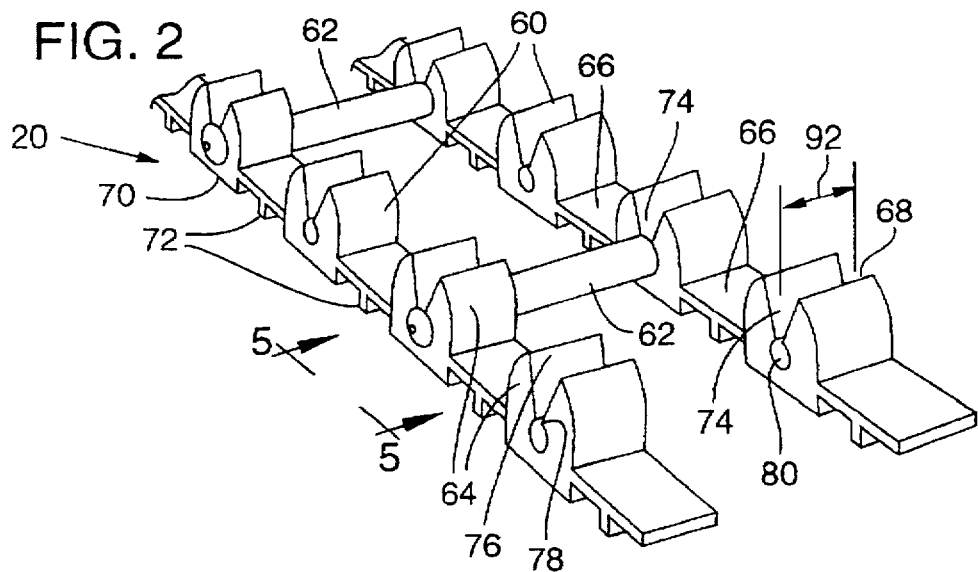
FIG. 2 is a perspective view of an assembled apparatus according to one embodiment of the invention in a linear configuration.

FIG. 2 shows an assembled seal cage 20 prior to installation in an injectable sealing compound system. The seal cage 20 comprises a pair of flexible elongate rails 60 that are laterally spaced apart by substantially rigid braces 62 that extend between the rails 60. The seal cage 20 thus has a ladder-like configuration. The rails 60 include a plurality of brace receptacles, or towers, 64 that are spaced apart at selected intervals longitudinally of the rail. As shown in FIGS. 2 and 3, the brace receptacles 64, are flexibly connected by connector portions 66 of the rails. These are shown as flexible strips or portions that connect to the brace receptacles 64 between the upper and lower ends thereof, noted as 68, 70, respectively. Upper end 68 will be positioned adjacent the shaft 26 when the seal cage 20 is installed, while lower end 70 will be adjacent the stuffing box bore 28. The connector 66 preferably is attached to the brace receptacle 64 at a point nearer lower end 70. Reinforcing lands 72, positioned intermediate spaced brace receptacles 64, extend from connectors 66 in the same direction as ends 70 to contact a plane occupied by ends 70 of adjacent brace receptacles (see FIGS. 3A–3D). The lands 72 are adapted to prevent buckling of connectors 66 in use.

A brace receptacle 64 can be of many different shapes, some of which are shown in FIGS. 2 and 3A–3D. A brace receptacle 64 has a first end 68 and a second end 70. A slot 74 extends inwardly from end 68 of the brace receptacle. The slot 74 has a tapered slot opening or entry way 76, a constricted throat 78, and a cylindrically shaped slot end, or holding region, 80 that receives an end portion of a brace when inserted into the slot. The height of the brace receptacles 82 (i.e., the distance between the ends 68, 70 as seen in FIGS. 3A–3D) corresponds with and should be no greater than a preferred packing seal ring size. For example, 5/16 inch packing seal rings require a brace receptacle height 82 of slightly less than 5/16 inch.

Figure 4A:
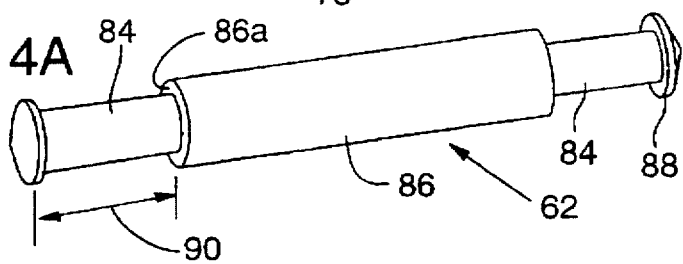
FIGS. 4A and 4B are perspective views of two different embodiments of a brace.

As shown in FIG. 4A, in one embodiment a brace 62 is a generally cylindrical elongate rigid pin machined to have opposed head portions 88 at opposite ends thereof and a central region 86 having shoulders 86a, all of substantially equal diameter. Adjacent the head portions 88 are neck portions 84 of a smaller diameter than the head portions 88 and central portions 86. The length 90 of portion 84 is sufficient to receive the width of a brace receptacle 64.

Figure 4B:
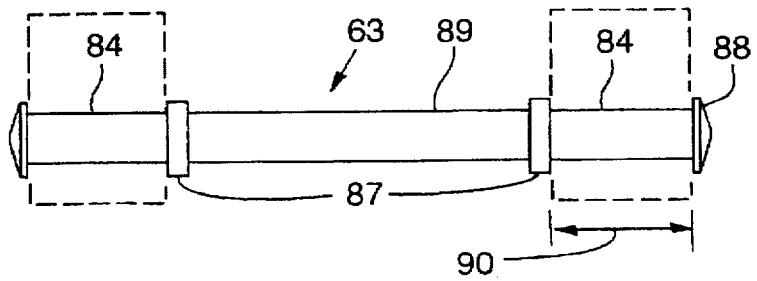

As shown in FIG. 4B, in another embodiment of a pin 63, the central region is replaced by narrow annular shoulders 87 between which is a region 89 having substantially the same diameter as neck portions 84. This pin design can be employed with all pin lengths, and particularly with shorter pin lengths.

When a pin 62 (or pin 63, if desired) is inserted into a brace receptacle 64, the brace receptacle 64 is captured between head portion 88 and shoulder 86a (or 87). Head portion 88 projects outside the rail 60 and bears against one side of the brace receptacle 64, and shoulder 86a (or 87) bears against the opposite side of the brace receptacle 64, thereby preventing the rails 60 from moving together or apart.

As shown in FIG. 2, the seal cage 20 is designed to permit substantially free and unhindered flow of injectable sealing compound, which may have a putty-like consistency, to completely fill and seal the stuffing box bore 28 in the space between the packing seal rings 22, 24 occupied by the seal cage 20. The dimensions and spacing of the pins 62 is such that the seal cage 20 is substantially open in the area between the laterally spaced rails 60. Preferably the braces, or pins, 62 occupy a minor portion of the space between the rails, and more preferably less than 25 percent of such space. Thus, the area defined between the rails 60 is about 50 percent or more open and more preferably about 75 percent or more open. This as calculated by dividing the combined cross-sectional area of the braces (i.e., pin diameter× distance between rails×number of pins) by the total area defined between the rails (i.e., rail length×distance between rails). Injectable sealing compound can also flow into the spaces between the connector portions 66 and the ends 68, 70 of the brace receptacles. The use of substantially round pins 62 (rather than braces of square or other shapes) also facilitates free movement of the injectable sealing compound. Since injectable sealing compound tends to flow more easily into the larger open spaces between connector 66 and ends 68 than into the smaller open spaces between connector 66 and end 70, the assembled seal cage 20 tends to be pushed by injectable sealing compound away from the shaft 26 towards the bore 28 as the compound eventually fills all openings.

When the seal cage 20 is assembled and installed between packing seal rings 22, 24, the head portions 88 embed into the packing seal rings 22, 24 and prevent rotation of the seal cage 20. Alternatively, the rails 60 can be provided with extensions to embed into the packing seal ring material or, alternatively, with slots or grooves into which packing seal ring material can extend, to accomplish the same purpose.

The seal cage is designed for use with such injectable sealing compounds as Thermo-P & S® (Hendler's Inc., Markham, Ontario, Canada), TP-4000® (Tom-Pac, Inc., St-Laurent, Canada), and CMS 2000® (A. W. Chesterton Co., Stoneham, Mass.). Mechanical pressure applied to each of the two packing seal rings 22, 24 by the seal cage 20 is approximately the same. This design therefore provides a good seal between the packing seal rings 22, 24, shaft 26, and stuffing box bore 28 to contain injectable sealing compound injected into the system 10 with very little leakage in either direction. In addition, openings between the braces are large enough to permit highly viscous injectable sealing compounds, which may be putty-like in consistency, to completely fill the seal cage and to seal to the shaft and to the walls of the stuffing box.

A rail 60 may be provided as a continuous roll or length of material from which one or more rails of a selected length are cut to an appropriate size for the stuffing box bore 28, i.e., to fit snugly to the stuffing box bore 28 and away from the shaft 26. Alternatively, rails 60 can be pre-formed to an appropriate length, in which case the rails 60 can be provided in a closed, annular form or in an open, linear form as shown. Connecting portions 66 are thin enough to provide sufficient flexibility to permit a rail 60 to curve about a central axis to conform to the shaft 26, yet wide enough to substantially restrict or prevent flexing of the rail 60 in a direction substantially parallel to the brace receptacles. As shown, connecting portions 66 are substantially equal in width to the rail 60.

Rails 60 preferably are made of a molded plastic material that is reasonably flexible, is chemically resistant, is suitable for use over a large temperature range, and does not score the shaft 26 around which the rails 60 are wrapped when shaft contact occurs. A preferred material for the rails 60 is a molded plastic, such as an ultra high molecular weight (UHMW) polypropylene (e.g., Pellethane® 2103-65D, Dow Chemical Co., Midland, Mich.) or other conventional materials, including but not limited to, nylon, glass-filled PTFE, nylon, or polyethylene depending upon the required temperature range and chemical resistance. Inflexible materials can also be used for the rails 60 (e.g., a rigid molded plastic or a metal such as stainless steel or brass) as long as the rails are disposable around a shaft. For example, the rails can be in a pre-formed annular configuration or be provided with conventional flexible joints or hinges, e.g., at the point of attachment between connecting portions 66 and brace receptacles 64, to permit the rails to bend about a central axis into a curved configuration.

The pins 62 can be made from the same material as the rails 60 or a stronger and more rigid material, e.g., a molded plastic (e.g., Delrin® 100, Dupont Co., Wilmington, Del.), a metal (e.g., stainless steel or brass), or other conventional material that has the required temperature range and chemical resistance.

Figure 3A:
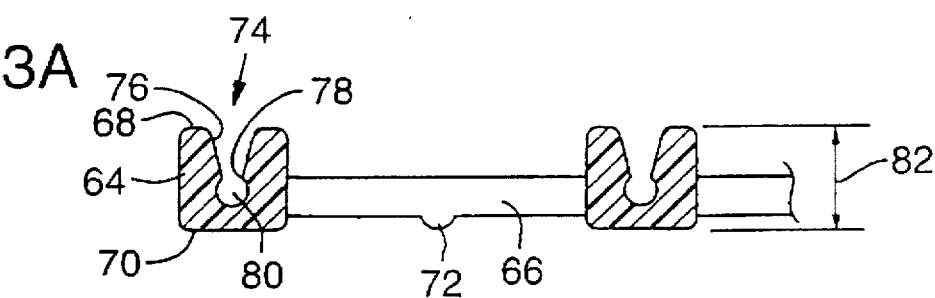
FIGS. 3A–D are cross-sectional views of portions of rails having brace receptacles of different heights.
Figure 3B:
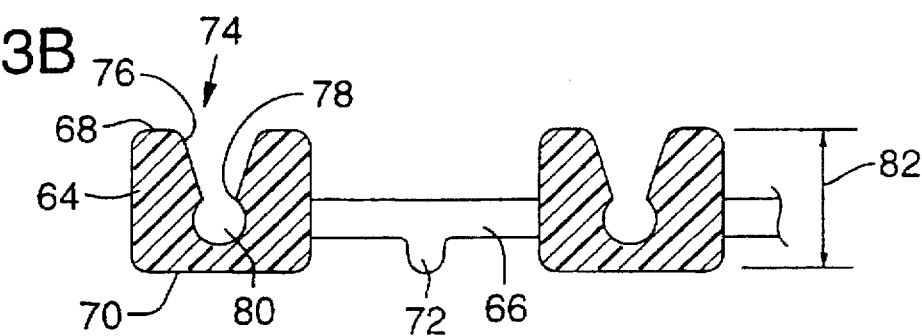
Figure 3C:
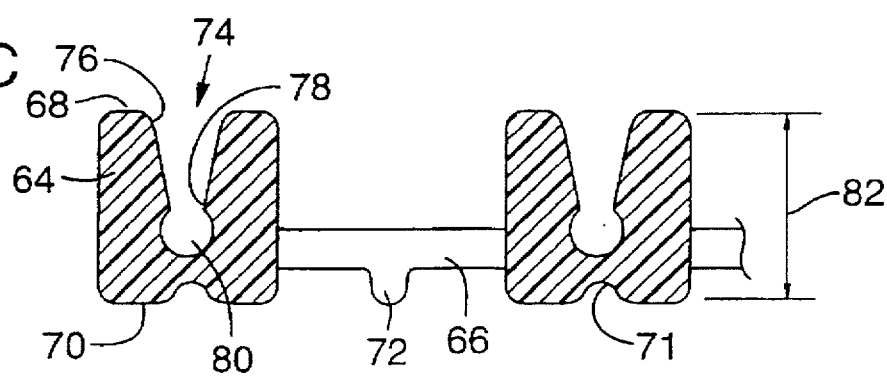
Figure 3D:
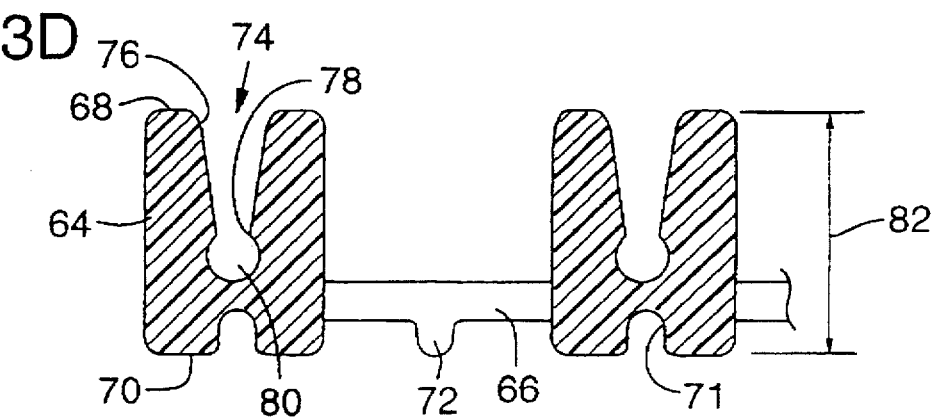
Figure 6:
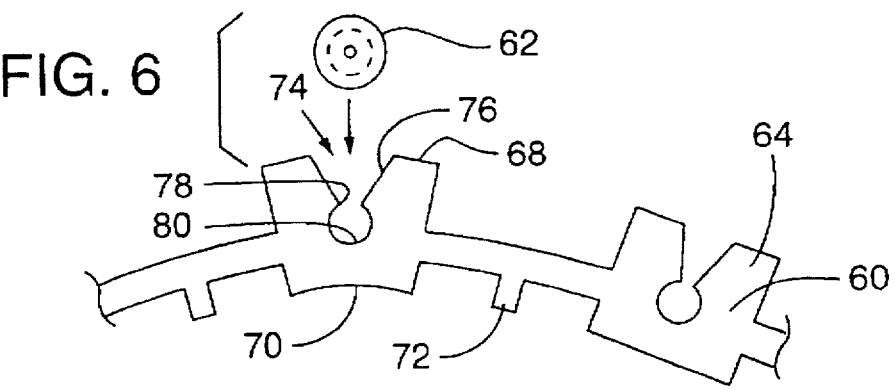
FIG. 6 is a side view showing a rail bent back to permit a pin to be inserted into a slot of a brace receptacle.
Figure 7:
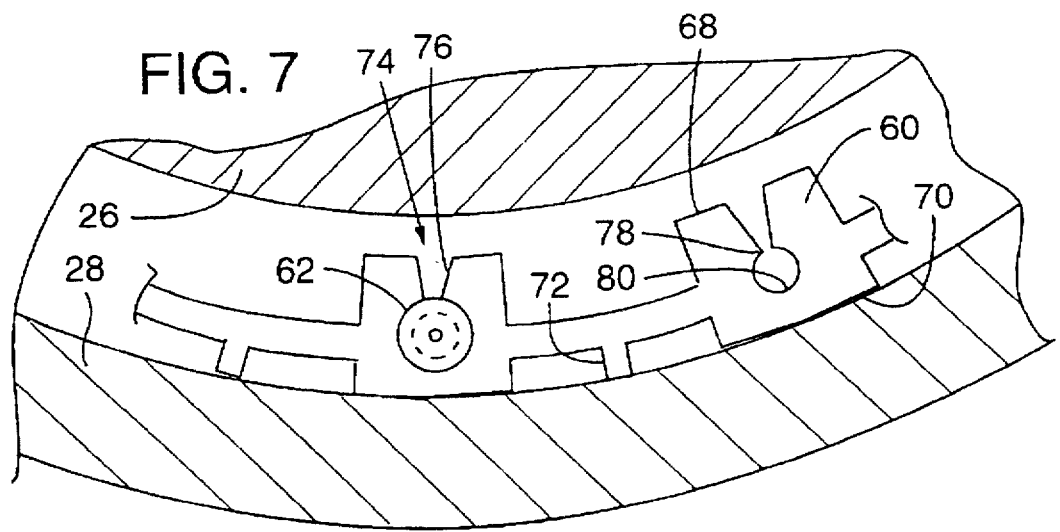
FIG. 7 is a side view showing that when a rail is disposed around a shaft, the slot opening of a brace receptacle partially closes and the pin is firmly held by the brace receptacle.

In order to assemble a seal cage 20 according to the invention, a first rail 60 is bent back as shown in FIG. 6, thereby causing the slot 74 to flex and partially open (i.e., relative to a slot 74 of a rail 60 lying flat as shown in FIG. 2) to permit a pin 62 to be inserted past throat 78 into place in the holding region 80 of a brace receptacle 64. (As shown in FIG. 3D, the bottom end 70 of the brace receptacles, particularly larger brace receptacles, can be provided with a substantially central groove 71, to facilitate flexing of the slot 74.) When the rail 60 is not so flexed, a pin or brace 62 is frictionally held in the slot end 80. As shown in FIG. 7, the seal cage 20 is preferably disposed around a shaft 26 such that the slot 74 is partially closed (relative to a slot 74 of a rail 60 lying flat as shown in FIG. 2) and the pin 62 is held firmly in place in the slot end 80. Pins 62 are installed, preferably in every other brace receptacle 64 or more frequently to provide additional stability. (An additional pin 62 also can be installed in a brace receptacle 64 at the end of a seal cage 20, particularly if there is a significant gap between the opposed ends of a seal cage 20 when it is disposed around a shaft 26.)

A second rail 60 of similar length is aligned with the first, bent in the same way, and the pins 62 are likewise snapped into place in the second rail 60 to complete the assembly of a seal cage. The braces, or pins, are held in laterally aligned receptacles in the laterally spaced apart rails. As can be readily appreciated by persons of ordinary skill in the art, this process can be reversed in order to remove and replace pins in a seal cage according to the present invention.

Figure 5:
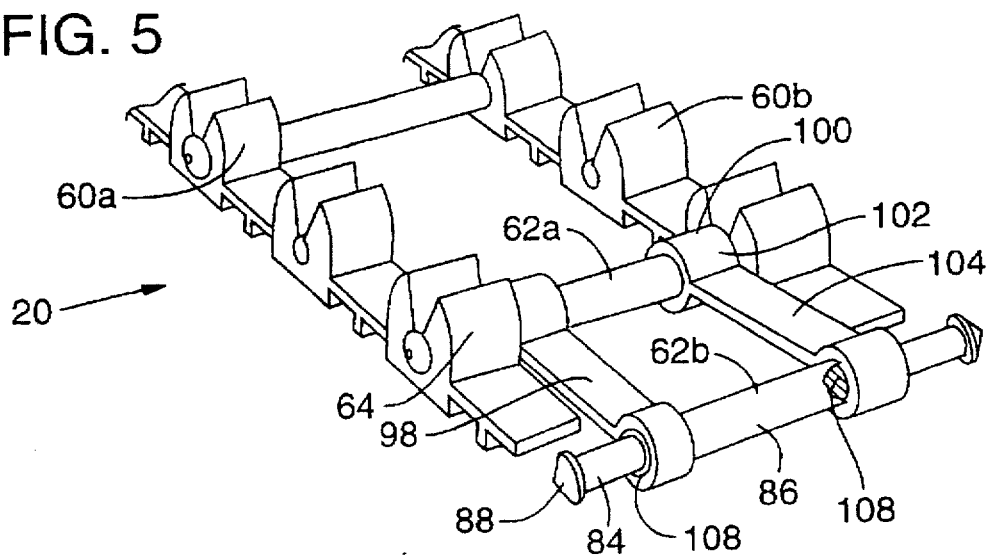
FIG. 5 is a perspective view of a length of seal cage at the end of which is attached a master link.

As shown in FIG. 5, two lengths of seal cage 20 may be connected to form a longer seal cage by using a master link 98. If desired, the two ends of a seal cage can also be joined by such a master link. The master link 98, shown in FIG. 5, has two side-by-side linking elements 100, each linking element 100 comprising two end portions 102 spaced apart by a connecting portion 104. First and second braces, or pins, 62a, 62b pass through central openings 108 in the end portions of the linking elements 102, which have a diameter at least as large as the central portions 86 (or shoulders 87) of the pins. The first pin 62a is inserted into brace receptacles 64 at the end of paired rails 60a, 60b of a first length of seal cage 20, interior to the paired rails 60a, 60b. The second pin 62b is inserted into brace receptacles 64 at an opposed end of paired rails of a second length of a seal cage, again interior to the paired rails thereof.

A seal cage according to the invention can be conveniently provided in a kit form for use with SAE and/or metric packing seal ring sizes. In one embodiment such a seal cage kit includes: one or more long rails (from each of which one or more shorter rails can be cut to size), each rail having brace receptacles of a height corresponding to a preferred packing seal ring size; a plurality of pins; and one or more master links, which can be conveniently provided in a container with instructions for use, for example. Several rails for use with packing seal rings of different sizes also can be provided in a single kit for the sake of convenience. Simpler kits may provide only pins or only rails.

Sets of pins of different lengths can also be included in a kit. Different numbers of packing seal rings are used with various stuffing box designs; different pin lengths allow the user to fit the seal cage to any stuffing box depth. Different pin lengths also permit a user to vary the number of packing seal rings for a standard stuffing box design. For new installation it is generally preferable to use fewer packing seal rings, more injectable sealing compound, and thus longer pins. For standard installation, i.e., where standard packing material has been used previously, a wear groove may be present in the shaft (or in a sleeve associated with the shaft) under the bottom-most packing seal ring. An additional bottom packing seal ring can be used to prevent extrusion of injectable sealing compound past the bottom packing seal rings, in which case shorter pins and less injectable sealing compound are employed.

The following are exemplary pin lengths (SAE) for new or standard installation:

| | Installation | |
|---|---|---|
| Size of Packing Seal Rings | New | Standard |
| ⅜ inch | 1⅛ inch | ¾ inch |
| ½ inch | 1¾ inch | 1¼ inch |
| ⅝ inch | 2½ inch | 1⅞ inch |
| ¾ inch | 2¾ inch | 2 inch |

In one form of use, before installation in the stuffing box, an assembled seal cage is pre-packed with an injectable sealing compound. To do so, the seal cage is laid flat, slot side up. Injectable sealing compound is then rolled between the rails so as not to extend above the rails. When the seal cage is installed, the rails act like a rake to hold the injectable sealing compound in place and prevent extrusion of the compound.

Assembly of an injectable sealing compound system including a seal cage according to an embodiment of the invention is as follows. Bottom packing seal ring(s) 24 is disposed around the shaft 26. Next, assembled seal cage 20 is bent into an annular configuration around the shaft 26 adjacent the bottom packing seal ring(s) 24 such that slot openings 76 are positioned as shown in FIG. 7. The bottom packing seal ring(s) 24 and seal cage 20 are pushed to the bottom of the stuffing box bore 28. Then, one or more top packing seal rings 22 are installed around the shaft 26 (i.e., as many top packing seal rings 22 as are necessary to fill the remaining space in the stuffing box bore 28). Packing follower 38 is installed and packing follower nuts 40 are tightened sufficiently on studs 42 to seal the packing seal rings 22, 24 to the stuffing box bore 28 and to the shaft 26, with seal cage 20 positioned between the top and bottom packing seal rings 22, 24, respectively. Injectable sealing compound is then injected into system 10 through fluid inlet port 48.

The invention has been described with regard to injectable sealing compound systems. It can also be used, for example, with braided compression packing systems, as described, for example, in U.S. Pat. Nos. 4,498,681 and 5,013,053, which are incorporated herein by reference.

Having illustrated and described the principles of the invention in a preferred embodiment, it should be apparent to those skilled in the art that the invention can be modified in arrangement and detail without departing from such principles.

What is claimed is:

1. A seal cage for maintaining spacing between first and second packing seal rings associated with a rotatable or reciprocatable shaft, the seal cage comprising:
   first and second elongated rails adapted to be disposed around the shaft in laterally spaced positions between the first and second packing seal rings, each of said rails comprising a plurality of brace receptacles spaced apart longitudinally of the rail, and
   a plurality of spaced apart substantially rigid braces extending between the rails and releasably attached to said brace receptacles to maintain a selected spacing therebetween.

2. The seal cage of claim 1 wherein the first and second rails are flexible to permit bending about a central axis into a curved configuration.

3. The seal cage of claim 2 wherein the rails have restricted flexibility in a direction substantially parallel to the central axis.

4. The seal cage of claim 1 wherein a rail is cut from a length of flexible material that is longer than the rail.

5. The seal cage of claim 1 wherein the rails are made of an inflexible material.

6. The seal cage of claim 1 wherein a brace comprises a head portion that extends beyond a rail.

7. The seal cage of claim 1 wherein the rail further comprises a flexible connector element interconnecting adjacent brace receptacles.

8. The seal cage of claim 1 wherein the adjacent brace receptacles each have opposed first and second ends with the first ends projecting outwardly in one direction from the connector element, and the rail further comprises a land positioned between the adjacent brace receptacles and extending from the connector element to contact a plane occupied by the first ends of the adjacent brace receptacles.

9. The seal cage of claim 1 wherein a brace receptacle is configured to releasably hold an end portion of a brace.

10. The seal cage of claim 9 wherein the brace receptacle defines a flexible slot adapted to hold the end portion of the brace when the rail is curved in a first direction and to open to permit entry or release of the end portion when the rail is curved in a second direction opposite to the first direction.

11. The seal cage of claim 1 wherein a brace comprises an elongate element having a head portion at an end thereof adapted to bear against a side of the first rail facing away from the second rail and project outwardly therefrom, and a shoulder spaced inwardly from the end of the brace adapted to bear against a side of the first rail facing toward the second rail, thereby restricting lateral movement of the first rail relative to the second rail.

12. The seal cage of claim 1 wherein a brace is generally cylindrical.

13. The seal cage of claim 1 wherein the rails and braces define a ladder-like configuration.

14. The seal cage of claim 13 wherein each rail comprises a plurality of brace receptacles spaced apart longitudinally of the rail, brace receptacles on the first rail are laterally aligned with brace receptacles on the second rail, and braces extend between the aligned brace receptacles.

15. The seal cage of claim 1 wherein the braces occupy a minor portion of the space between the first and second rails.

16. The seal cage of claim 1 wherein at least about 50 percent of an area defined between the rails is open.

17. The seal cage of claim 16 wherein at least about 75 percent of the area is open.

18. An elongated rail, adapted to be disposed around a shaft as part of a seal cage for maintaining a laterally spaced relation between packing seal rings, the rail comprising an elongate flexible element having a plurality of brace receptacles spaced apart longitudinally thereof, each of said brace receptacles having a first lower end and a second upper end, said second end having a tapered slot that is configured to releasably hold an end portion of a substantially rigid brace such that, when the rail is aligned with a similar rail in a laterally spaced position, the brace extends between the rails to maintain a selected spacing therebetween, and a connector element interconnecting adjacent brace receptacles, said first end projecting from a plane defined by said connector element in a direction opposite that of said second end.

19. A rail of claim 18 that has flexibility in a first direction to permit curving about a central axis but has restricted flexibility in a second direction substantially parallel to the central axis to inhibit bending in the second direction.

20. A rail of claim 18 wherein said connector element interconnecting adjacent brace receptacles is flexible.

21. A rail of claim 20 wherein the rail further comprises a land positioned between adjacent brace receptacles and extending from the connector element to contact a plane occupied by the first ends of the adjacent brace receptacles.

22. The rail of claim 18 wherein said flexible slot is adapted to hold the end portion of the brace when the rail is curved in a first direction and to open to permit entry or release of the end portion when the rail is curved in a second direction opposite to the first direction.

23. An injectable sealing compound system for a rotatable or reciprocatable shaft, the system in operative position comprising:
   a housing surrounding the shaft;
   spaced apart first and second packing seal rings disposed within the housing around the shaft; and
   a seal cage for maintaining spacing between the first and second packing seal rings comprising first and second elongated rails disposed around the shaft in laterally spaced positions between the first and second packing seal rings, each of said rails comprising a plurality of brace receptacles spaced apart longitudinally of the rail, and a plurality of spaced apart substantially rigid braces extending between the rails and releasably attached to said brace receptacles to maintain a selected spacing therebetween.

24. A kit for a universal seal cage for maintaining spacing between first and second packing seal rings of an injectable sealing compound system associated with a rotatable or reciprocatable shaft, the kit comprising:

first and second elongate flexible rails adapted to be disposed around the shaft in laterally spaced positions between the first and second packing seal rings, each rail comprising an elongate flexible element having a plurality of brace receptacles spaced apart longitudinally thereof, each of said brace receptacles having a first lower end and a second upper end, said second end having a tapered slot that is configured to releasably hold an end portion of a substantially rigid brace such that, when the rail is aligned with a similar rail in a laterally spaced position, the brace extends between the rails to maintain a selected spacing therebetween, and a connector element interconnecting adjacent brace receptacles, said first end projecting from a plane defined by said connector element in a direction opposite that of said second end; and a plurality of substantially rigid braces adapted to releasably attach to and extend between the rails to maintain a selected spacing therebetween.

25. The kit of claim 24 wherein the first and second rails are provided as part of a longer rail adapted to be cut to selected lengths to produce the first and second rails.

26. The kit of claim 24 further comprising a master link to connect shorter sections of a seal cage to produce a longer seal cage.

27. The kit of claim 25 which comprises braces of different lengths to permit the spacing between the rails to be varied.

28. A method of maintaining a fixed spacing between first and second packing seal rings disposed around a rotatable or reciprocatable shaft in an injectable sealing compound system, the method comprising:

providing first and second elongated rails having brace receptacles, the rails being adapted to be disposed around the shaft in laterally spaced positions;

providing a substantially rigid brace having first and second end portions;

releasably attaching said first and second end portions of the brace to the first and second rails such that the brace extends between the rails to maintain a selected spacing therebetween, thereby producing an assembled seal cage; and disposing the seal cage around the shaft between the packing seal rings.

29. The method of claim 28, wherein a brace has first and second end portions, the first rail has a first brace receptacle, and the second rail has a second brace receptacle, the method further comprising the steps of:

laterally aligning the first and second brace receptacles; and releasably attaching the first end portion of the brace to the first brace receptacle and the second end portion of the brace to the second brace receptacle.

* * * * *